United States Patent

Becker et al.

[15] 3,655,437
[45] Apr. 11, 1972

[54] PROCESS FOR TEXTILES WITH AQUEOUS LIQUORS OF POLYISOCYANATES AND SILICA SOLS

[72] Inventors: Gustav Becker, Leverkusen-Schlebusch; Heinz Griepentrog, Cologne; Wolfgang Klebert; Friedrich Reich, both of Leverkusen, all of Germany

[73] Assignee: Farbenfabriken Bayer Aktiengesellschaft, Leverkusen, Germany

[22] Filed: Mar. 27, 1969

[21] Appl. No.: 811,258

[30] Foreign Application Priority Data

Apr. 6, 1968 Germany............P 17 69 121.3

[52] U.S. Cl............117/161 ZB, 117/138.8 R, 117/138.8 F, 117/138.8 D, 117/138.8 E, 117/138.8 N, 117/139.5 A, 117/141, 117/161 KP
[51] Int. Cl.............................C10m 7/48, D06c 29/00
[58] Field of Search..............117/161 KP, 161 ZB, 139.5 A

[56] References Cited

UNITED STATES PATENTS

| | | | |
|---|---|---|---|
| 3,351,561 | 11/1967 | Albrecht et al. | 117/100 X |
| 3,505,252 | 4/1970 | Brotherton et al. | 117/161 |
| 3,505,262 | 4/1970 | Freyhold et al. | 117/161 X |
| 3,243,399 | 3/1966 | Dinges et al. | 117/161 X |

FOREIGN PATENTS OR APPLICATIONS 745,960   3/1956   Great Britain..........117/161

OTHER PUBLICATIONS

" Liquid Castable Elastomers from Hydroyxl-Terminated Polybutadienes" by Verdol et al. in 2 parts part I Rubber Age July 1966 pp. 57– 64 part II Rubber Age August 1966 pp. 62– 68

*Primary Examiner*—William D. Martin
*Assistant Examiner*—Mathew R. P. Perrone
*Attorney*—Plumley, Tyner & Sandt

[57] ABSTRACT

An improvement in the process of treating textile materials with aqueous compositions of polyisocyanate materials containing free-isocyanate groups is obtained by incorporating silica sol in the composition. The presence of the silica sol allows the compositions to be applied by the exhaustion method. Optionally, emulsion stabilizer, e.g., polymers of vinyl monomers can be added, as well as electrolytes which speed up drawing onto the textile fibers.

5 Claims, No Drawings

PROCESS FOR TEXTILES WITH AQUEOUS LIQUORS OF POLYISOCYANATES AND SILICA SOLS

The present invention relates to a process for the finishing of textile materials; more particularly it concerns a process wherein the textile materials are treated with aqueous liquors which contain isocyanate group-carrying reaction products of compounds of molecular weight 500 to 6,000 containing at least two hydroxyl groups, with polyisocyanates; the process is characterized in that the textile materials are treated according to the exhaust process with aqueous liquors which contain silica sols, in addition to the isocyanate group-containing reaction products.

The silica sols to be used in the process according to the invention are commercial silica sols the particle size of which is comprised, for example, between 10 and 50 m . The amount in which the silica sols are added to the aqueous liquors may vary within wide limits; in general, an addition of 0.3–5 g per liter of treating liquor has proved to be advantageous.

The isocyanate group-containing reaction products used in the aqueous liquors are obtained in known manner by reacting the compounds of molecular weight 500 to 6,000 which contain at least two hydroxyl groups, with a stoichiometric excess, calculated on the hydroxyl content, of polyisocyanates or their bisulphite addition products at elevated temperatures.

Examples of compounds of molecular weight 500 to 6,000 which contain at least two hydroxyl groups are polyalkylene ether glycols, such as polyethylene, polypropylene, polybutylene or polyhexylene glycol; polyalkylene ether polyols, e.g., polyalkylene ether triols, such as the addition products of ethylene and propylene oxide on to trimethylolpropane; furthermore polyesters, as are obtained, for example, from aliphatic dicarboxylic acids, such as succinic acid, adipic acid, sebacic acid or maleic acid, and polyhydric alcohols, such as ethylene glycol, diethylene glycol, propylene glycol, butanediol and neopentyl glycol.

Examples of polyisocyanates are aliphatic diisocyanates, such as tetramethylene diisocyanate, hexamethylene diisocyanate, 1,4-cyclohexane diisocyanate, 4,4 -dicyclohexyl-methane diisocyanate, and 2,4- and 2,6-hexahydrotoluylene diisocyanate; diisocyanates, such as p-phenylene diisocyanate and 2,4- or 2,6-toluylene diisocyanate; as well as triisocyanates, such as the reaction product of the formula

OCN—(CH ) —N—[CONH—(CH ) —NCO]

which can be obtained from 3 mol hexamethylene diisocyanate and 1 mol of water.

The content of isocyanate group-containing reaction products in the aqueous liquors may vary within wide limits; in general, amounts of 0.2 to 20 g, preferably 0.5 to 5 g, per liter of liquor have proved satisfactory.

In order to stabilize the liquors which contain isocyanate group-carrying reaction products, it is expedient to add emulsion stabilizers to the liquors. Emulsion stabilizers are, for example, anion-active compounds, such as fatty alcohol sulphates or paraffin sulphonates, and, in particular, non-ionic compounds, such as the polymers or copolymers prepared from vinyl or divinyl monomers.

The polymers and copolymers used as emulsion stabilizers in the aqueous liquors may be based on the following vinyl or divinyl monomers, for example: ethylene, propylene, vinyl chloride, vinyl acetate, vinyl ethers, such as vinyl ethyl ether; furthermore, styrene or divinyl-benzene, butadiene, isoprene or chloroprene; and , -unsaturated carboxylic acids, such as acrylic acid and methacrylic acid as well as their nitriles, esters and amides. Polymers which contain groups capable of reacting with isocyanates have proved particularly advantageous; for example, the polymers or copolymers prepared from acrylic acid, methacrylic acid, their hydroxyalkyl esters or amides; as well as the copolymers which are obtained when N-methylol-acrylamide, N-methylol-methacrylamide, or their derivatives prepared by the reaction with alcohols containing at least one further functional group, are copolymerised with other olefinic-unsaturated compounds, for example, according to the process of U.S. Pat. No. 3,243,399 ( British Pat. No. 1,002,451 ).

The amounts in which the emulsion stabilizers are added to the aqueous liquors may vary within wide limits; however, it has proved particularly advantageous, for example, to add fatty alcohol sulphates or paraffin sulphonates in an amount of 0.01 to 2 g, preferably 0.05 to 0.2 g, per liter of liquor, and the polymers or copolymers in an amount of 0.1 to 20 g, preferably 1 to 3 g, per liter of liquor.

In order to reduce the period of time during which the polymers and isocyanate group-containing reaction products draw on the textile materials, it is frequently advisable to add electrolytes to the treating baths, for example, alkali metal and ammonium salts of inorganic acids, e.g., sodium sulphate, ammonium sulphate, ammonium salts of inorganic acids, e.g., sodium sulphate, ammonium phosphate, or alkali metal and ammonium salts of organic acids, e.g., sodium acetate and ammonium acetate. The amounts in which the electrolytes are added to the liquors may vary within wide limits; in general, amounts of 2 to 10 g per liter of liquor have proved satisfactory.

The treatment of the textile materials according to the process of the invention can be carried out, for example, by agitating the textile materials at room temperature in a liquor ratio of 1 : 6 to 1 : 50 in the aqueous liquor which contains the isocyanate group-carrying reaction products and optionally contains emulsion stabilizers and the pH value of which amounts to about 4–6, for a short time, about 1 to 20 minutes; then adding the silica sol; again allowing the liquor to act for a short time, about 5 to 30 minutes; then, optionally after the addition of an electrolyte and another brief action of the liquor for about 5 to 30 minutes, centrifuging or squeezing; and subsequently drying.

The textile materials treated in this way, such as yarns, textured yarns, fabrics, knitted fabrics or finished articles of fabrics and knitted fabrics, may subsequently be subjected to other finishing processes, e.g., dyeing, optionally after an ageing treatment with H O or after a short storage for about 1 to 2 days.

With the aid of the process according to the invention it is possible to impart an excellent finish to textile materials of natural polyamides, such as wool and silk, caseine fibres, or synthetic fibers, such as polyamide, polyurethane, polyester, polycarbonate, polyacrylonitrile, polypropylene fibres. The treated textile materials are characterized by excellent properties in use, such as resistance to scraping, creasing, and pilling and by insensitivity to soiling. In textile materials of wool, moreover, an excellent felt-free finish is achieved, which is fast to washing. The feel of the textile materials can also be advantageously affected by the process according to the invention.

The parts given in the examples are parts by weight.

EXAMPLE 1

A pre-washed worsted fabric of pure wool is treated in a washing machine in a liquor ratio of 1 : 5 at room temperature for about 10 minutes with an aqueous liquor containing, per liter, 60 g of a mixture prepared by stirring into 12 g of the 50 percent stock emulsion described below first 3 g of the 40% aqueous copolymer dispersion described below, and then 45 ml of water.

Before adding the mixture, the pH value of the liquor had been adjusted to 4.5–5 by the addition of acetic acid. There is then added to the liquor, per liter, 2 g of 30 percent silica sol, diluted with 18 ml of water and acidified to pH 5–6 with acetic acid, and the treatment is continued for another 30–40 minutes. Subsequently there is added to the liquor, per liter, 6 g of sodium acetate, dissolved in 40 ml of water, and the treatment is again continued for 10–15 minutes. The worsted fabric is then centrifuged and dried on a stenter at 100 C. By the treatment there is obtained an excellent felt-free finish which is fast to washing and a very good creasing resistance of the worsted fabric.

The 50 percent stock emulsion used above was obtained in the following way:

1,000 parts of an 80 percent solution of the isocyanate group-containing reaction product described below, in ethyl acetate were slowly poured, while vigorously stirring with a high capacity rapid stirrer (3,000–10,000 r.p.m.) into 980 parts of cold water which had been acidified to pH 5–6 with acetic acid and mixed with 20 g paraffin sulphonate. The emulsion was ready after stirring for 3 to 5 minutes.

The reaction product containing isocyanate groups was obtained in the following way:

3,000 parts of a polypropylene glycol having a molecular weight of about 2000, a OH number of 55.5 and an acid number < 0.5 were heated with 535 parts hexamethylene diisocyanate at 110° C. for 2 hours and subsequently at 130°–140° C for 1½ hours.

The 40 percent aqueous copolymer dispersions was obtained by copolymerization of 60 parts acrylic acid butyl ester, 30 parts styrene and 10 parts acrylic acid amide in water.

EXAMPLE 2

A loose wool fabric is treated in a nozzle washing machine, after washing and without intermediate drying, in a liquor ratio of 1 : 6 at room temperature for about 2 minutes with an aqueous liquor containing, per liter, 27.5 g of a mixture
prepared by stirring into
 6 g of the 50 percent stock emulsion described below first
 1.5 g of the 40 percent aqueous copolymer dispersion described in Example 1 and then
 20 ml of water.

Before adding the mixture, the pH value of the liquor had been adjusted to pH 4.5–5.5 by the addition of acetic acid. There is then added to the liquor, per liter, 1.5 g of 30 percent silica sol
 diluted with 13 ml of water and
 acidified with acetic acid to pH 5–6, and the treatment is continued for another 15–20 minutes. Subsequently, there is added to the liquor, per liter, 4.5 g of sodium acetate,
 dissolved in 15 ml of water, and the treatment is again continued for 5–10 minutes. The wool fabric is then centrifuged and dried on a stenter at 90°–110b$L$ C. The treated wool fabric is characterized by a full handle and excellent felt-free effects, besides very good properties in use, such as resistance to scraping, creasing and pilling.

The 50 percent stock emulsion was prepared as described in Example 1, but the isocyanate group-containing reaction product there used was replaced with the reaction product obtained in the following way:

1,000 parts of a branched polypropylene glycol which had been prepared by propoxylation of trimethylolpropane and had a molecular weight of 3,750, a OH number of 45 and an acid number < 0.5 was heated with 135 parts hexamethylene diisocyanate at 110° C for 2 hours and subsequently at 130° C for 1 hour.

EXAMPLE 3

A costume fabric of pure wool (pique) is treated in a nozzle washing machine operating at low gear, in a liquor ratio of 1 : 6 at room temperature for about 10 minutes with an aqueous liquor containing, per liter, 52.2 g of a mixture
prepared by stirring into
 10 g of the 50 percent stock emulsion described in Example 1 first
 2.2 g of the 40 percent copolymer dispersion described in Example 1 and then
 40 ml of water.

Before adding the mixture, the pH value of the liquor had been adjusted to 4.5–5 by the addition of acetic acid. There is then added to the liquor, per liter, 1.5 g of 30 percent silica sol
 diluted with 12 ml of water and
 acidified to pH 5 with acetic acid and the treatment is continued for another 20 minutes. Subsequently, there is added to the liquor, per liter, 4.5 g of sodium acetate
 dissolved in 15 ml of water and the treatment is continued for another 25 minutes. The wool fabric is then centrifuged and dried at 100° C. There is obtained a wool fabric with an excellent shrink-proof finish and very good properties in use, such as resistance to scraping and creasing.

EXAMPLE 4

Pullovers of carded yarn (Shetland wool) are treated in a drum washing machine in a liquor ratio of 1 : 10 at room temperature for about 5–10 minutes with an aqueous liquor containing, per liter, 52 g of a mixture
prepared by stirring into
 10 g of the 50 percent stock emulsion described in Example 2 first
 2 g of the 40 percent copolymer dispersion described in Example 1 and then
 40 ml of water.

Before adding the mixture, the pH value had been adjusted to 4.5–5 by the addition of acetic acid. There is then added to the liquor, per liter, 1 g of 30 percent silica sol
 diluted with 10 ml of water and
 acidified to pH 5–6 with acetic acid and the treatment is continued for another 20 minutes. Subsequently, the pullovers are centrifuged and dried in a tumbler at 80°–90° C. An excellent felt-free finish of the pullovers, which is fast to washing, is achieved by the treatment. Moreover, the knitted fabric has a very good resistance to scraping and pilling.

EXAMPLE 5

Lambswool pullovers in the grey are treated in a paddle machine in a liquor ratio of 1 : 30 at room temperature for about 10 minutes with an aqueous liquor containing, per liter, 26 g of a mixture
prepared by stirring into
 5 g of the 50 percent stock emulsion described in Example 1 first
 1 g of the 40 percent copolymer dispersion described in Example 1 and then
 20 ml of water.

Before adding the mixture, the pH value of the liquor had been adjusted to 4.5–5 by the addition of acetic acid. There is then added to the liquor, per liter, 0.5 g of 30 percent silica sol
 diluted with 5 ml of water and
 acidified to pH 5–6 with acetic acid and the treatment is continued for another 20 minutes. The pullovers are subsequently dyed by the method conventionally used for knitted articles of wool at boiling temperature from a long bath. After rinsing, centrifuging and drying, the pullovers are shaped and steamed. The pullovers thus treated are characterized by a soft flowing handle and by good resistance to pilling and they have an excellent felt-free finish.

EXAMPLE 6

Pullovers of pure wool in the grey are treated in a washing machine in a liquor ratio of 1 : 10 at room temperature for about 10 minutes with an aqueous liquor containing, per liter, 38 g of a mixture
prepared by stirring
 30 ml of water into
 8 g of the 50 percent stock emulsion described in Example 2.

Before adding the mixture, the pH value of the liquor had been adjusted to 4.5–5 by the addition of acetic acid. There is then added to the liquor, per liter, 2 g of 15 percent silica sol
 diluted with 20 ml of water and
 acidified to pH 5–6 with acetic acid and the treatment is continued for another 15–20 minutes. Subsequently, there is added to the liquor, per liter, 3 g of sodium acetate, dissolved in 15 ml of water and the treatment is again continued for 10–15 minutes. After centrifuging and drying in a tumbler, the pullovers are dyed by the method conventionally used for knitted articles of wool from a long bath. After another centrifuging and drying at 80°–90 C, the pullovers are shaped and steamed. The treated pullovers are characterized by a pleasant handle and very good pilling resistance and they have an excellent felt-free finish.

EXAMPLE 7

Stockings of pure wool are treated in a drum washing machine in a liquor ratio of 1 : 10 at room temperature for about 10 minutes with an aqueous liquor containing per liter, 32.5 g of a mixture
prepared by stirring into
  6 g of the 50 percent stock emulsion described in Example 1
first
  1.5 g of the copolymer dispersion described in Example 1
and then
  25 ml of water.

Before adding the mixture, the pH value had been adjusted to 4.5–5 by the addition of acetic acid. There is then added to the liquor, per liter, 1 g of 15 percent silica sol
    diluted with 10 ml of water and
    acidified to pH 5–6 with acetic acid.

The treatment is continued for another 15–20 minutes. Subsequently, there is added to the liquor, per liter, 3 g of sodium acetate
    dissolved in 20 ml of water and the treatment is again continued for 15–20 minutes. The stockings are then centrifuged, dried in a tumbler at 80°–90° C and subjected to the usual shaping and steaming processes. The stockings thus treated are characterized by outstanding resistance to shrinkage, very good pilling resistance and fastness to scraping.

EXAMPLE 8

A mixed fabric consisting of 55 percent of polyacrylonitrile fibre and 45 percent of wool is treated in a nozzle washing machine in a liquor ratio of 1 : 6 at room temperature for about 10 minutes with an aqueous liquor containing, per liter, 46 g of a mixture
prepared by stirring into
  9 g of the 50 percent stock emulsion described in Example 2
first
  2 g of the 40 percent copolymer dispersion described in Example 1 and then
  35 ml of water.

Before adding the mixture, the pH value of the liquor had been adjusted to 4.5–5 by the addition of acetic acid. There is then added to the liquor, per liter, 1.5 g of 30 percent silica sol
    diluted with 12 ml of water and
    acidified to pH 5–6 with acetic acid and the treatment is continued for another 30–40 minutes. Subsequently, there is added to the liquor, per liter, 4.5 g of sodium acetate
    dissolved in 15 ml of water and the treatment is again continued for 10–15 minutes. The fabric is then calendered in a continuous calender, subsequently centrifuged and dried on a stenter. The treated fabric is characterized by a full firm handle, very good pilling resistance, fastness to creasing and scraping. It is also dirt-repellent.

EXAMPLE 9

A mixed fabric consisting of 55 percent of polyester fibre and 45 percent of wool is treated in a winch vat in a liquor ratio of 1 : 40 at room temperature with an aqueous liquor containing, per liter, 12.5 g of a mixture
prepared by stirring into
  2 g of the 50 percent stock emulsion described in Example 1
first
  0.5 g of the 40 percent copolymer dispersion described in Example 1 and then
  10 ml of water.

Before adding the mixture, the pH value of the liquor had been adjusted to 4.5–5 by the addition of acetic acid. There is then added to the liquor, per liter, 0.4 g of 30 percent silica sol
    diluted with 4 ml of water and
    acidified to pH 5–6 with acetic acid and the treatment is continued for another 30–40 minutes. Subsequently, there is added to the liquor, per liter, 1 g of sodium acetate
    dissolved in 5 ml of water and the treatment is again continued for 10–15 minutes. The fabric is then calendered in a continuous calender, subsequently centrifuged and dried on a stenter. The fabric is then thermofixed at 180°–185° C for about 30 seconds and finished in the usual way. The treated fabric is characterized by a pleasant full handle, good fastness to wet creasing and good pilling resistance. The wool component also has an excellent felt-free finish.

A fabric with a similar good finish is obtained when the mixed fabric is first thermofixed and then subjected to the treatment with the aqueous treatment liquor described above.

EXAMPLE 10

Woollen yarn in hanks is treated, after dyeing and rinsing but without intermediate drying, in a liquor ratio of 1 : 40 in a dyeing apparatus for about 10–15 minutes with an aqueous liquor containing, per liter, 10 g of a mixture
prepared by stirring into
  2 g of the 50 percent stock emulsion described in Example 2
first
  0.5 g of the 40% copolymer dispersion described in Example 1 and then
  7.5 ml of water.

Before adding the mixture, the pH value of the liquor had been adjusted to 4–4.5 by the addition of acetic acid. There is then added to the liquor, per liter, 0.4 g of 30 percent silica sol
    diluted with 4 ml of water and
    acidified to pH 5–6 with acetic acid and the treatment is continued for another 15–20 minutes. Subsequently, there is added to the liquor, per liter, 1 g of sodium acetate
    dissolved in 5 ml of water and the treatment is again continued for 10 minutes. The yarn hanks are then centrifuged and dried. The knitted fabrics produced after 1–2 days' storage from the yarn thus treated have an excellent felt-free finish and are characterized by good resistance to scraping, wet creasing and pilling.

EXAMPLE 11

Undyed wool yarn is treated in a dyeing apparatus in a liquor ratio of 1 : 40 at room temperature for about 10–15 minutes with an aqueous liquor which contains, per liter, 3 g of the 50 percent stock emulsion described in Example 1 and
  0.1 g of an approximately 30 percent aqueous solution of a fatty alcohol sulphate and the pH of which has been adjusted to 4.5–5 by the addition of acetic acid. There is then added to the liquor, per liter, 0.4 g of 30 percent silica sol
    diluted with 4 ml of water and
    acidified to pH 5–6 with acetic acid and the treatment is continued for another 15–20 minutes. Subsequently, there is added to the liquor, per liter, 1 g of sodium acetate
    dissolved in 5 ml of water which has been
    acidified to pH 5–6 with acetic acid and the treatment is again continued for about 10 minutes. After the addition of 0.5 g sodium pyrophosphate and
  5 g of 35 percent hydrogen peroxide per liter of liquor, the treating bath is heated to 50° C within 1 hour and kept at this temperature for 30 minutes. After draining off the liquor and rinsing, the yarn is dyed in the usual manner from a weakly acidic bath. The knitted fabrics produced from the yarn have an excellent felt-free finish and a full woolly handle, and they are characterized by good resistance to scraping, pilling and wet creasing.

EXAMPLE 12

A knitted fabric of a textured polyamide fiber is treated in a winch vat in a liquor ratio of 1 : 40 at room temperature for about 15 minutes with an aqueous liquor which contains, per liter, 1.5 g of the 50 percent stock emulsion described in Example 1 and 0.25 g of a 30 percent fatty alcohol sulphate solution and the pH value of which has been adjusted to 4.5–5 by the addition of acetic acid. There is then added to the liquor, per liter, 0.25 g of 30 percent silica sol diluted with 2.5 ml of water and acidified to pH 5–6 with acetic acid and the treatment is continued for another 20 minutes. Subsequently, there is added to the liquor, per litre, 1 g of sodium acetate dissolved in 5 ml of water which has been acidified to pH 5–6 with acetic acid and the treatment is continued for a further 20 minutes while the bath temperature is raised to 45° C. The knitted fabric is subsequently rinsed, centrifuged and dried. When dyed after 12 hours' storage, the treated knitted fabric is characterized in that it does not exhibit the inconvenient wet stiffness. Furthermore, the finished knitted fabric has a pleasant handle which is fast to washing and dry cleaning, an excellent retention of shape and fastness to creasing.

We claim:

1. In the process for finishing textile material by treating with aqueous liquors comprising isocyanate group-containing reaction products of (A) stoichiometric excess of organic polyisocyanates with (B) compounds having a molecular weight of 500–6,000 and containing at least 2 hydroxyl groups; the improvement which comprises applying said aqueous liquor containing 0.3 to 5 g per liter of silica sol as an additional ingredient, by exhaustion onto said textile material.

2. The process of claim 1 wherein the aqueous liquor contains, in addition, an emulsion stabilizer.

3. The process of claim 2 wherein the emulsion stabilizers are polymers or copolymers prepared from vinyl or divinyl monomers.

4. The process of claim 2 wherein the aqueous liquor contains, in addition, an electrolyte.

5. The process of claim 1 wherein the ratio of textile material to liquor is 1:6 to 1:50.

* * * * *

UNITED STATES PATENT OFFICE
CERTIFICATE OF CORRECTION

Patent No. 3,655,437                     Dated April 11, 1972

Inventor(s)  BECKER, ET AL.

It is certified that error appears in the above-identified patent and that said Letters Patent are hereby corrected as shown below:

| Column: | Line | Error |
|---|---|---|
| 1 | 16 | "50m." should read -- 50mμ. --. |
| 1 | 39 | "4,4" should read -- 4,4' --. |
| 1 | 41 | "; diisocyanates" should read -- ; aromatic diisocyanates --. |
| 1 | formula 44 | "OCN-(CH)-N-[CONH-(CH)-NCO]" should -- $OCN-(CH_2)_6-N-[CONH-(CH_2)_6-NCO]_2$ -- |
| 1 | 63 | "and, " should read -- and $\alpha, \beta$ --. |
| 2 | 35 | "HO" should read -- $H_2O_2$ --. |
| 3 | 44 | "110bLC" should read -- 110°C --. |

Signed and sealed this 22nd day of January 1974.

(SEAL)
Attest:

EDWARD M. FLETCHER, JR.          RENE D. TEGTMEYER
Attesting Officer                 Acting Commissioner of Patents